US010489767B2

(12) United States Patent
Muller et al.

(10) Patent No.: US 10,489,767 B2
(45) Date of Patent: Nov. 26, 2019

(54) CLOUD-BASED POINT-OF-SALE TRANSACTION PROCESSING

(71) Applicant: Square, Inc., San Francisco, CA (US)

(72) Inventors: Eric Dickeson Muller, San Francisco, CA (US); Christopher Philip Renke, San Francisco, CA (US); Mathew Wilson, Sausalito, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/396,520

(22) Filed: Apr. 26, 2019

(65) Prior Publication Data

US 2019/0251536 A1 Aug. 15, 2019

Related U.S. Application Data

(63) Continuation of application No. 16/370,486, filed on Mar. 29, 2019, which is a continuation of application No. 15/180,734, filed on Jun. 13, 2016, now Pat. No. 10,289,991.

(51) Int. Cl.
*G06Q 20/20* (2012.01)
*G06Q 30/06* (2012.01)
*G06F 9/54* (2006.01)

(52) U.S. Cl.
CPC ............ *G06Q 20/202* (2013.01); *G06F 9/54* (2013.01); *G06Q 30/0633* (2013.01)

(58) Field of Classification Search
CPC ...... G06K 7/008; G06K 7/0095; G06Q 10/08; G06Q 20/202; G06Q 20/206; G06Q 30/08; G06Q 40/04; G06Q 40/06
USPC .................................. 235/376–383; 370/338
See application file for complete search history.

(56) References Cited

U.S. PATENT DOCUMENTS

| 7,209,892 | B1 | 4/2007 | Galuten et al. |
| 7,685,052 | B2 | 3/2010 | Waelbroeck et al. |
| 7,702,578 | B2 | 4/2010 | Fung et al. |
| 7,936,736 | B2 * | 5/2011 | Proctor, Jr. ........... H04W 4/029 370/338 |
| 8,582,549 | B2 | 11/2013 | Cho et al. |

(Continued)

OTHER PUBLICATIONS

Bellare, et. al., "Forward Security in Private-key Cryptography",In re Topics in Cryptology—CT-RSA 2003, Lecture Notes in Computer Science, vol. 2612, Feb. 28, 2003 , 24 pages.

(Continued)

*Primary Examiner* — Andrew Joseph Rudy
(74) *Attorney, Agent, or Firm* — Lee & Hayes, P.C.

(57) ABSTRACT

Techniques for processing a transaction using one or more service computing devices of a payment service that processes transactions for multiple merchants including a merchant are described. A first point-of-sale device operable by the merchant is configured to (i) receive, from a first point-of-sale (POS) device operable by the merchant, transaction data indicating an amount to charge a customer for at least one item ordered by the customer from the merchant in a transaction, and (ii) send the transaction data to a second POS device operable by the merchant, and the second POS device is configured to (i) receive the transaction data, (ii) generate payment data via a card reader associated with the second POS device, and (iii) transmit the payment data to a payment gateway for processing payment for the transaction.

30 Claims, 8 Drawing Sheets

(56) References Cited

U.S. PATENT DOCUMENTS

| | | | |
|---|---|---|---|
| 9,355,155 B1 | 5/2016 | Cassel et al. | |
| 9,430,784 B1 | 8/2016 | Frederick et al. | |
| 9,515,999 B2 | 12/2016 | Ylonen | |
| 9,569,757 B1 | 2/2017 | Wilson et al. | |
| 9,757,644 B2* | 9/2017 | Rose | G06Q 20/12 |
| 9,779,396 B2* | 10/2017 | Uzo | G06Q 20/204 |
| 9,817,646 B1 | 11/2017 | Chen et al. | |
| 9,824,233 B2 | 11/2017 | Kaplan et al. | |
| 9,972,003 B2 | 5/2018 | Mooring, II et al. | |
| 10,043,162 B1 | 8/2018 | Renke et al. | |
| 10,078,820 B2 | 9/2018 | Renke et al. | |
| 10,289,991 B1* | 5/2019 | Muller | G06Q 20/202 |
| 10,366,377 B2* | 7/2019 | Modi | G06Q 20/202 |
| 10,366,385 B1* | 7/2019 | Ramalingam | H04W 4/029 |
| 2002/0082985 A1 | 6/2002 | MacKay | |
| 2004/0002918 A1 | 1/2004 | McCarthy et al. | |
| 2004/0249745 A1 | 12/2004 | Baaren | |
| 2005/0038738 A1 | 2/2005 | Peck et al. | |
| 2005/0192871 A1 | 9/2005 | Galuten et al. | |
| 2008/0082418 A1 | 4/2008 | Fordyce et al. | |
| 2008/0103966 A1 | 5/2008 | Foster | |
| 2010/0274719 A1 | 10/2010 | Fordyce, III | |
| 2012/0072347 A1 | 3/2012 | Conway | |
| 2012/0166311 A1 | 6/2012 | Dwight et al. | |
| 2013/0024358 A1 | 1/2013 | Choudhuri et al. | |
| 2014/0101037 A1 | 4/2014 | Ornce et al. | |
| 2014/0180925 A1 | 6/2014 | Fordyce, III | |
| 2015/0178712 A1 | 6/2015 | Angrish et al. | |
| 2015/0206128 A1* | 7/2015 | Torossian | G06Q 20/3278 705/21 |
| 2015/0332296 A1 | 11/2015 | Chu et al. | |
| 2015/0339661 A1 | 11/2015 | Li et al. | |
| 2016/0307176 A1 | 10/2016 | Renke et al. | |
| 2017/0126663 A1 | 5/2017 | Blass | |

OTHER PUBLICATIONS

Kelsey, et al., "Signed Syslog Messages", Internet Engineering Task Force, Proposed Standard, May 2010, 40 pages.

Marson et al., "Even more practical secure logging: Tree-based Seekable Sequential Key Generators", Computer Security—ESORICS 2014; European Symposium on Research in Computer Security, 2014, 17 pages.

Marson et al., "Practical Secure Logging: Seekable Sequential Key Generators", Computer Security—ESORICS 2013; European Symposium on Research in Computer Security, 2013, 19 pages.

Office Action for U.S. Appl. No. 15/923,403, dated Oct. 1, 2018, Staub et al., "Detecting Alterations of Journal Data Structures", 44 pages.

Office Action for U.S. Appl. No. 15/197,412, dated Dec. 6, 2017, Wolter et al., "Deferred Transaction Processing", 10 pages.

Office Action for U.S. Appl. No. 15/197,412, dated Apr. 27, 2017, Wolter et al., "Deferred Transaction Processing", 11 pages.

Office Action for U.S. Appl. No. 15/923,403, dated May 23, 2018, Staub et al., "Detecting Alterations of Journal Data Structures", 38 pages.

Office Action for U.S. Appl. No. 15/197,412, dated Jul. 10, 2017, Wolter et al., "Deferred Transaction Processing", 2 pages.

Office Action for U.S. Appl. No. 15/197,412, dated Sep. 28, 2016, Wolter et al., "Deferred Transaction Processing", 12 pages.

Rasey, "AnywhereCommerce Introduces AC CorePay Opened SDK Interface for Developers", available at <<https://www.anywherecommerce.com/anywherecommerce-introduces-ac-corepay-opened-sdk-interface-for-developers/>>, Apr. 7, 2014, 6 pages.

Anywhere Commerce, "SDKs & APIs", available at <<https://web.archive.org/web/20150621161327/http://anywherecommerce.com/products/developer-tools/>>, 2015, 1 page.

* cited by examiner

CLOUD-BASED POINT-OF-SALE TRANSACTION PROCESSING

RELATED APPLICATIONS

This application is a continuation of, and claims priority to, U.S. patent application Ser. No. 16/370,486, filed on Mar. 29, 2019, which is a continuation of U.S. patent application Ser. No. 15/180,734, filed on Jun. 13, 2016, which issued as U.S. Pat. No. 10,289,991 on May 14, 2019, the entire contents of which are incorporated herein by reference.

BACKGROUND

In today's commerce, merchants often utilize an array of different electronic devices, including point-of-sale (POS) devices, to engage in transactions with customers. For instance, at a restaurant, a merchant can use multiple POS devices to conduct transactions with customers. While conducting the transactions, the POS devices can send and receive data with another in order to for the POS devices to stay updated with each transaction. The data can include information about customer orders. For instance, the data can indicate items ordered by the customers during the transactions with the merchant. The merchant can then use the POS devices to process each of the transactions.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
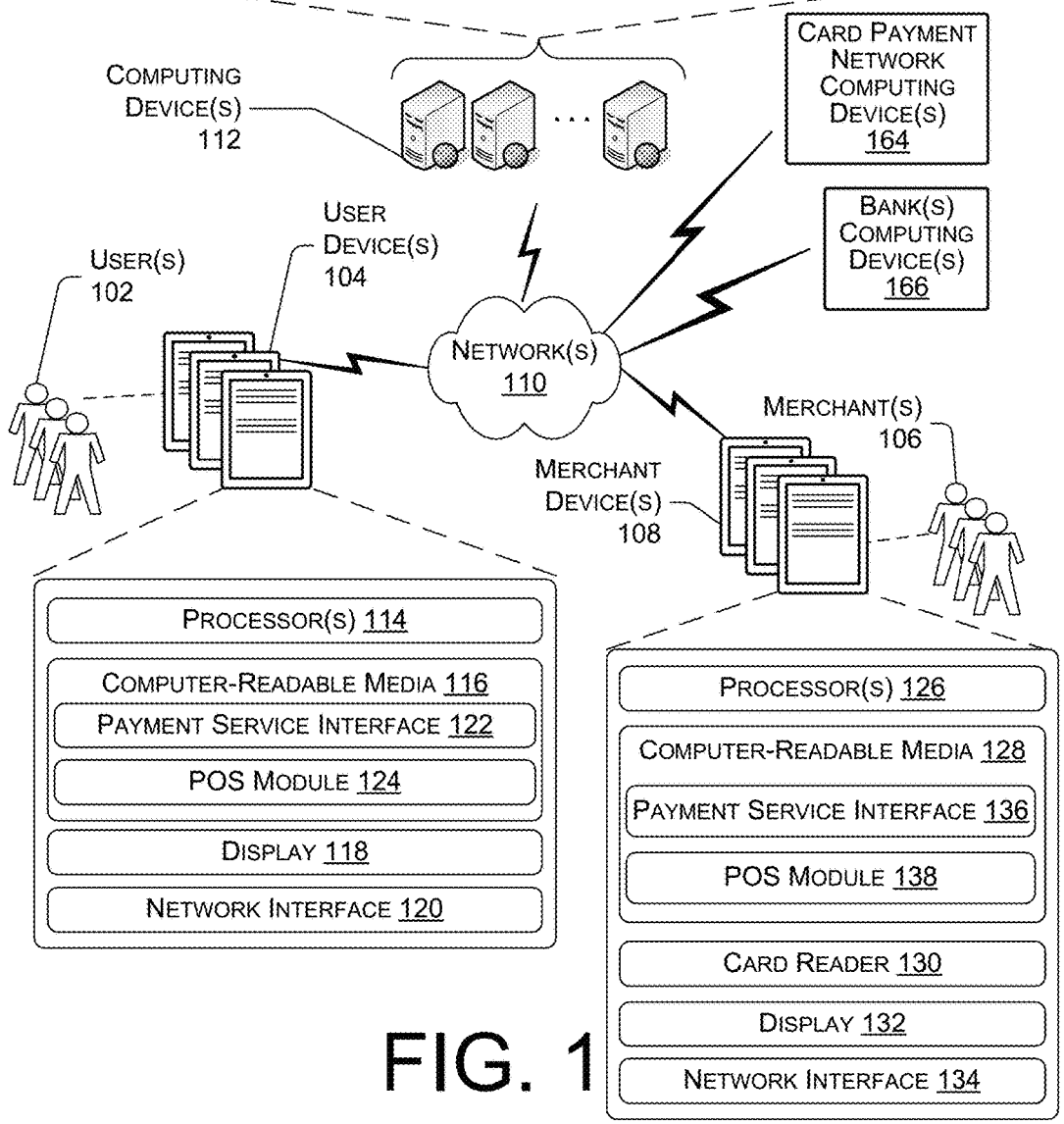
FIG. 1 illustrates an example system for handling open ticket transactions among customers and merchants.

This disclosure describes systems and processes for synchronizing, between electronic devices, open tickets using application programming interfaces (API)s. In some examples, a merchant can utilize at least a first point-of-sale (POS) device and a second POS device when conducting transactions with customers. The first POS device can include first hardware and first software (e.g., a first operating platform running a first POS software application) that the first POS utilizes to conduct transactions with customers. For instance, in some examples, the first POS device can include a legacy system that executes POS software to generate local tickets for transactions. A local ticket can include a data structure that the first POS device uses to store local information (e.g., information from the first POS device) associated with interactions between the merchant and a customer. For instance, the POS device can add (e.g., store) data indicating items ordered by the customer from the merchant. In some examples, the local ticket is local to the first POS device. For instance, based on the first hardware and/or first software, the first POS device is not able to synchronize data associated with the local ticket with the second POS device.

The second POS device can include second hardware and second software (e.g., a second operating platform running a second POS software application) that the second POS device utilizes to conduct transactions for customers using a payment service. For instance, the second POS software application can synchronize the second POS device with the payment service and using the synchronization, the second POS software application and the payment service can perform operations associated with conducting transactions with customers. For instance, in some examples, the second POS device can execute the second POS software application to generate open tickets using the payment service via a network connection. An open ticket is a data structure stores information associated with interactions between the merchant and customers during the course of a transaction. The interactions can include an identity of the merchant, a location of the merchant, identities of the customers, items order by the customers during the transaction, timestamps for each of the items ordered by the customers during the transaction, a cost associated with each of the items, or the like.

In some examples, the open ticket data structures further includes versioning data structures that the second POS device and the payment service use when synchronizing the open ticket data structures with one another. For instance, a versioning data structure of an open ticket data structure can include a vector that indicates each time the open ticket data structure is updated (e.g., indicates a version of the open ticket data structure, which is updated each time data is added to the open ticket data structure). For instance, in some examples, each time the open ticket data structure is updated by the second POS device and/or the payment service, a count of the vector can be updated (e.g., increased, such as from one to two).

Additionally, in some examples, the second POS device can utilize the second POS software application to process transactions for customers using the payment service via the network connection. In some examples, the first hardware and/or the first software of the first POS device may differ from, and be not be compatible with, the second hardware and/or second software from the second POS device. For instance, the first POS software application on the first POS device may not configure the first POS device to synchronize with the payment service in order to conduct transaction using the payment service.

For instance, in some examples, since the first hardware and/or the first software of the first POS device differs from, and is not be compatible with, the second hardware and/or second software from the second POS device, the first POS device and the second POS device are unable to synchronize. For instance, the first POS device may not be configured to send data associated with local tickets to the second POS device. Additionally, the first POS device may not be configured to receive data associated with open tickets from the second POS device. Rather, the first POS device is configured to update the local ticket, and process the local ticket at the end of the transaction.

Additionally, the second POS device may not be configured to send data associated with the open tickets to the first POS device. Additionally, the second POS device may not be configured to receive data associated with the local tickets from the first POS device. Rather, the second POS device is configured to synchronize with other merchant devices (e.g., other POS devices) that utilize the second hardware and/or second software. For instance, the second POS device is configured to send and receive data associated with open tickets to other POS devices that include similar hardware and/or software as the second POS device. Furthermore, the second POS device is configured to synchronize with the payment service. For instance, the second POS device can send and receive data associated with open tickets with the payment service.

In order to synchronize open tickets between the first POS device and the second POS device, the payment service can provide the first POS device with an application programming interface (API) for creating open tickets. For instance, the first POS device may generate a local ticket for a transaction. The first POS device can then generate cart information for the transaction that is based on the local ticket. In some examples, the cart information can include one or more of items acquired by a customer, a cost for each of the one or more items, a cost of the local ticket, an identity of the first POS device, an identity of the customer, or the like. The first POS device can then call the API from the payment service and send the cart information to the payment service via the API. In some examples, the first POS device can further send the payment service a request to charge the transaction on the second POS device and/or send the payment service an address (e.g., URL) associated with the first POS device.

In some examples, the payment service can generate an open ticket using the cart information. For instance, the payment service can wrap the cart information received from the first POS device in an open ticket data structure. Wrapping the cart information in the open ticket data structure can include adding (e.g., storing) data associated with the cart information in the data structure of the open ticket. As such, the open ticket data structure can include data indicating one or more of the items acquired by the customer, a cost for each of the items, a cost of the open ticket, an identity of the first POS device, an identity of the customer, or the like. In some examples, the open ticket data structure can further include a versioning data structure for synchronizing the open ticket data structure with other POS devices.

The payment service can then synchronize with the second POS device. For instance, the payment service can send data associated with the open ticket to the second POS device. The data can indicate at least the items acquired by the customer and the cost of the open ticket to the second POS device. In some examples, the data can further include the versioning data structure of the open ticket. Additionally, in some examples, the payment service can further send a priority associated with the open ticket to the second POS device.

The second POS device can receive the data associated with the open ticket. In some examples, the second POS device can utilize the versioning data structure to determine that the open ticket is a new open ticket (e.g., that the second POS device has not previously received data associated with the open ticket). The second POS device can then provide (e.g., display) the open ticket to the merchant. The merchant can use the second POS device to charge the customer for the open ticket. For instance, in some examples, the merchant can input information associated with a payment instrument into the second POS device. In such examples, the second POS device can send the information associated with the payment instrument to the payment service for processing. The payment service can attempt to authorize the payment instrument for the cost of the open ticket. After authorizing the payment instrument, the payment service can send the second POS device a message indicating that the payment instrument has been charged for the cost of the open ticket.

In some examples, after authorizing the payment instrument, the payment service can further send a message to the first POS device that indicates that the payment instrument of the customer has been charged for at least a portion of the open ticket. For instance, in some examples, the payment service can use the address associated with the first POS device to send the message to the first POS device. The merchant can then use the first POS device and/or the second POS device to provide the customer with a receipt for the transaction.

By utilizing a payment service that provides APIs to the first POS device for receiving data associated with local tickets, the systems and processes described herein synchronize open ticket functionality between merchant devices that include incompatible hardware and/or software. For instance, the payment service is configured to both receive cart information associated with the local tickets from the first POS device, and then utilize the payment information to generate open tickets. The payment service is then able to synchronize with the second POS device. For instance, the payment service and the second POS device are configured to send and receive data associated with open tickets between one another.

FIG. 1 illustrates an example system 100 for handling open ticket transactions among customers and merchants. More particularly, FIG. 1 provides a framework for providing functionality associated with synchronizing open tickets between electronic devices (e.g., between merchant devices and/or between user devices and merchant devices). In some examples, the electronic devices of FIG. 1 can include different operation platforms and/or software for conducting transactions.

As shown in FIG. 1, the system 100 may include one or more user(s) 102 (e.g. customers), one or more user device(s) 104 associated with the user(s) 102, one or more merchants 106, one or more merchant devices 108 associated with the one or more merchants 106, one or more network(s) 110, and one or more computing device(s) 112. In various implementations, the user(s) 102 may operate the user device(s) 104, which may include one or more processor(s) 114, computer-readable media 116, a display 118 and a network interface 120. The computer-readable media 116 may store a payment service interface 122 and a POS module 124. Similarly, the merchant(s) 106 may operate the merchant device(s) 108, which may include one or more processor(s) 126, computer-readable media 128, a card reader 130, a display 132 and a network interface 134. The computer-readable media 126 may store a payment service interface 136 and a POS module 138. The computing device(s) 112 may also include one or more processor(s) 140, computer-readable media 142 and a network interface 144. The computer readable media 142 may store a user interaction module 146, a merchant interaction module 148, a payment module 150, an open ticket module, and a database 154.

In some implementations, one of the users 102 may operate a user device 104 to perform various functions associated with the user device 104. For example, a user of the user(s) 102 may utilize the user device 104, and particularly the payment service interface 122 thereof, to interact with the computing device(s) 112 via the network interface 120 to establish a user account with the payment service of the computing device(s) 112. In addition, a user of the user(s) 102 may utilize POS module 124 of the user device 104 to interface with the POS module 138 of the merchant device(s) 108, e.g. as part of a transaction using the payment service of the computing device(s) 112. For example, the user device 104 may communicate via the network interface 120 with the merchant device(s) 108 and the network interface 134. As an example of such a payment operation, the POS module 138 of the merchant device 108 may communicate with the POS module 124 of the user device 104 to obtain information for processing a payment from the user 102 to the merchant 106 using the payment service of the computing device(s) 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a module for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may be used to access an interface associated with the computing device(s) 112 (e.g. the payment service interface 136). Continuing the above example, a merchant device 108 may utilize information obtained from interacting with the POS module 124 of the user device 104 to execute the payment from the user 102 to the merchant 106 through the payment service of the computing device(s) 112. Further, the POS module 138 may control the operation of the card reader 130 to read payment information from credit cards, debit cards, gift cards and the like. Moreover, the POS module 138 may operate to interact with the card payment network computing devices(s) 164 and/or bank(s) computing device(s) 166 to execute payments from the user 102 to the merchant 106.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104. As discussed above, the computer-readable media 142 may store the user interaction module 146, the merchant interaction module 148, the payment module 150, the open ticket module 152, and the database 154. The database 154 may store various information including user account information 156, merchant information 158, open tickets 160, and application programming interfaces (APIs) 162.

The user interaction module 146 and merchant interaction module 148 operate to interface with the user devices 104 and merchant devices 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the user 102 and merchant 106, respectively. In addition, the payment module 150 may utilize information from the database 154, such as the user account information 156 and merchant information 158 to provide handling of payments between merchants and users. In some implementations, user account information 156 may include information regarding electronic payment accounts of the customers (e.g. users 102).

As mentioned above, the payment module 150 may handle payments between merchants and users. When paying for a transaction, a user 102 can provide the amount of payment that is due to a merchant 106 using cash, check, a payment card, NFC, or by electronic payment through a payment service of the computing device(s) 112. The merchant 106 can interact with the merchant device 108 to process the transaction. In some examples, the service of the computing devise 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). During point-of-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing device(s) 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing device(s) 112. The user 102 can create the user account, for example, by interacting with an application of the user device 104 that is configured to perform electronic payment transactions and that may execute on the user device 104 (e.g. the payment service interface 122). When creating an electronic payment account with the service of the computing device(s) 112, the user 102 may provide an image including the face of the user, data describing a financial account of the user 102 (e.g., a credit card number, expiration date), and a billing address. This user information can be securely stored by the computing device(s) 112, for example, in the user account information 156 in the database 154. Further, the user account information 156 may be created for each user 102, which may include information about the user and transactions conducted by the user.

To accept electronic payments for POS transactions, the merchant 106 may create a merchant account with the service of the computing device(s) 112 by providing information describing the merchant including, for example, a merchant name, contact information, e.g., telephone numbers, the merchant's geographic location address, and one or more financial accounts to which funds collected from users will be deposited. This merchant information 158 can be securely stored by the service, for example, in the database 154 along with the user account information 156. Further, a merchant profile may be created for each merchant, which may include information about the merchant and transactions conducted by the merchant.

The service of the computing device(s) 112 may be configured to enable electronic payments for transactions. The computing device(s) 112 can include one or more servers that are configured to perform secure electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment module 150 may be configured to send and receive data to and from the user device 104 and the merchant device 108. For example, the payment module 150 can be configured to send information describing merchants to an application on the user device 104 using, for example, the information stored in the database 154. For example, the payment module 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some embodiments, the payment module 150 is configured to determine whether a geographic location of the user device 104 is within a threshold geographic distance from a geographic location of the merchant device 108. The payment module 150 can determine a geographic location of the user device 104 using, for example, geolocation data provided by the user device 104. Similarly, the payment module 150 can determine a geographic location of the merchant device 108 using, for example, geolocation data provided by the merchant device 108 or using a geographic address, e.g., street address, provided by the merchant. Depending on the implementation, the threshold geographic distance can be specified by the payment module 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the payment module 150 restricts electronic payment transactions between the user 102 and the merchant 106 to situations where the geographic location of the user device 104 is within a threshold geographic distance from a geographic location of the merchant device 108.

The computing device(s) 112 can also be configured to communicate with one or more card payment network computing devices(s) 164 of a card payment network (e.g., MasterCard®, VISA®) over the one or more networks 110 to conduct financial transactions electronically. The computing device(s) 112 can also communicate with one or more bank computing devices 166 of one or more banks over the one or more networks 110. For example, the computing device(s) 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the card payment network computing devices(s) 164 of a card payment network and the bank computing devices 166 when processing transactions for payment instruments that do not involve the payment service of the computing device(s) 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing device(s) 112 indicating that the user 102 has checked in with the merchant 106. In response, the computing device(s) 112 can communicate data to notify the merchant device 108 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing device(s) 112. In response, the computing device(s) 112 can obtain, for example, from the user account information 156, data describing a financial account associated with the electronic purchase account of the user 102 to which the total amount will be charged.

The computing device(s) 112 can then communicate with the card payment network computing devices(s) 164 of a card payment network to complete an electronic payment transaction for the total amount to be charged to user's electronic payment account. Once the electronic payment transaction is complete, the computing device(s) 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

In some examples, the payment module 150 of the computing device(s) 112 and the POS module 138 of the merchant devices 108 can include synchronization functionality for open ticket data. For instance, and as described in detail below, a first merchant device 108 of a merchant 106 may include first hardware and first software (e.g., a first operating platform running a first software application, which can include the payment service interface 136 and/or the POS module 138) that the first merchant device 108 uses to conduct transactions with user(s) 102. Additionally, a second merchant device 108 of the merchant 106 may include second hardware and second software (e.g., a second operating platform running a second software application, which can include the payment service interface 136 and/or the POS module 138) that the second POS utilizes to conduct transactions with user(s) 102. In some examples, the first hardware and/or the first software of the first merchant device 108 may be different than, and not compatible with, the second hardware and/or the second software of the second merchant device 108.

Additionally, in some examples, the second software application can synchronize the second merchant device 108 with the computing device(s) 112 in order to perform operations associated with processing transactions. For instance, the second software application executing on the second merchant device 108 can synchronize with the payment module 150 of the computing device(s) 112 to process payments for user(s) 102. The second software application executing on the second merchant device 108 can further synchronize with the open ticket module 152 to generate open tickets for user(s) 102. Additionally, in some examples, the second merchant device 108 can generate open tickets for user(s) 102 and send the open tickets to the computing device(s) 112.

In some examples, an open ticket is a data structure that stores information associated with interactions between the merchant 106 and user(s) 102 during a course of a transaction. The interactions can include an identity of the merchant 106, a location of the merchant 106, identities of the user(s) 102, items order by the user(s) 102 during the transaction (e.g., cart information), timestamps for each of the items ordered by the customers during the transaction, a cost associated with each of the items, a cost associated with the open ticket, or other information associated with the transaction. After creating the open tickets, and during the course of the transactions, the second merchant device 108 and/or the computing device(s) 112 can update the data structures for the open tickets. For instance, the computing device(s) 112 can add (e.g., store) additional information associated with interactions between the merchant 106 and the user(s) 102 to the data structures.

In some examples, the open ticket data structures further include versioning data structures that the computing device(s) 112 and the second merchant device 108 utilize when synchronizing with one another. Each versioning data structure for a respective open ticket data structure can include a vector that indicates each time the respective open ticket data structure is updated by the computing device(s) 112 and/or the second merchant device 108. For instance, when an open ticket data structure is first created, the computing device(s) 112 and/or the second merchant device 108 may cause the vector of the versioning data structure to include a count of one. The computing device(s) 112 and/or the second merchant device 108 can then increase the count of the vector each time there is an update to open ticket data structure.

Open ticket data structures described herein may be generated, maintained, and synchronized using some or all of the techniques described in U.S. patent application Ser. No. 14/686,381, filed on Apr. 14, 2015 and entitled "Open Ticket Payment Handling with Offline Mode", which issued as U.S. Pat. No. 10,147,079 on Dec. 4, 2018, and U.S. patent application Ser. No. 14/871,776, filed Sep. 30, 2015, entitled "Anticipatory Creation of Point-Of-Sale Structures," which issued as U.S. Pat. No. 9,569,757 on Feb. 14, 2017, which are incorporated herein by reference in their entireties.

In some examples, the first software application on the first merchant device 108 cannot synchronize with the computing device(s) 112 to process transactions for user(s) 102. For instance, in some examples, the first merchant device 108 may include a legacy system that includes POS software that is not compatible with the computing device(s) 112 for creating open tickets and/or processing transactions for user(s) 102. In such examples, the computing device(s) 112 can provide the first merchant device 108 with one or more APIs 162 for sending data to the computing device(s) 112. The APIs 162 can include code that provides the first merchant device 108 with the functionality to provide data to the computing device(s) 112, where the computing device(s) 112 can use the data to create open tickets. For instance, the computing device(s) 112 can execute an application that listens to one or more network addresses and responds to requests that are received via the one or more network addresses based on the APIs 162 functionality.

For instance, the merchant 106 can input one or more items that are being acquired by a user 102 into the first merchant device 108. The first merchant device 108 can generate a local ticket associated with the one or more items for the user 102. The local ticket can include a data structure that the first merchant device 108 uses to store local information (e.g., information from the first merchant device 108) associated with interactions between the merchant 106 and the user 102. In some examples, the local ticket is local to the first merchant device 108. For instance, based on the first hardware and/or first software, the first merchant device 108 is not able to synchronize data associated with the local ticket with the second POS device 108

The local ticket can include one or more of an identity of the merchant 106, an identity of the user 102, a list of the one or more items, a cost associated with each of the one or more items, a total cost for the one or more items, or the like. In some examples, the merchant 106 can then select a button (e.g., a third-party tender button) on the first merchant device 108 that causes the first merchant device 108 to translate the local ticket into cart information. The cart information can include data that indicates one or more of the identity of the merchant 106, the identity of the user 102, the list of the one or more items, the cost associated with each of the one or more items, the total cost for the one or more items, or the like.

After generating the cart information, the first merchant device 108 can send the cart information to the computing device(s) 112 via the one or more APIs 162. Additionally or alternatively, in some examples, the first merchant device 108 can send, via the one or more APIs 162, a request to charge the transaction associated with the cart information on the second merchant device 108 and/or an address for sending data back to the first merchant device 108. The computing device(s) 112 can then utilize the open ticket module 152 to generate an open ticket that is based on the cart information.

For instance, the computing device(s) 112 can utilize the open ticket module 152 to generate an open ticket data structure for the transaction. In some examples, the open ticket data structure includes a versioning data structure that the computing device(s) 112 use for synchronization. The computing device(s) 112 then wrap the cart information received from the first merchant device 108 in the open ticket data structure. For instance, in some examples, the computing device(s) 112 can add (e.g., store) data that indicates the one or more items acquired by the user 102 in the open ticket data structure. In such examples, the computing device(s) 112 can then determine the cost of each of the items, and use the costs of the items to determine a total cost for the open ticket. The computing device(s) 112 can then update the open ticket data structure by adding data indicating the cost of each of the items and the total cost of the item to the open ticket data structure.

After generating the open ticket for the transaction, the computing device(s) 112 can synchronize with the second merchant device 108. For instance, the computing device(s) 112 can send data associated with the open ticket to the second merchant device 108. In some examples, the data indicates the one or more items acquired during the transaction and the cost of the open ticket. The data can further include the versioning data structure for the open ticket. Additionally, in some examples, the computing device(s) 112 can further send the second POS device 108 the request to charge the transaction that is received from the first POS device.

The second merchant device 108 can receive the data associated with the open ticket from the computing device(s) 112. Based on receiving the data, the second merchant device 108 can provide a user interface that includes one or more of the identity of the merchant 106, the identity of the user 102, the list of the one or more items, the cost associated with each of the one or more items, the total cost for the open ticket, or the like. The merchant 106 can then use the second merchant device 108 to process the transaction with the user 102.

In some examples, the second merchant device 108 processes the transaction using the computing device(s) 112. For instance, in some examples, the second merchant device 108 can send information associated with a payment instrument to the computing device(s) 112 and the computing device(s) can use the information to attempt to authorize the payment instrument. In some examples, the second merchant device 108 can process the transaction without using the computing device(s) 112. For instance, the user 102 may pay for the transaction using physical currency, or the second merchant device 108 can attempt to authorize the payment instrument of the user 102 without using the computing device(s) 112. The second merchant device 108 can then send the computing device(s) 112 an indication that the transaction has been processed.

In either of the examples above, the computing device(s) 112 can send the first merchant device 108 a confirmation that the transaction has been processed. For instance, the computing device(s) 112 can use the address of the first computing device 108 to send the first computing device 108 data indicating that the transaction has been processed. Additionally, in some examples, the computing device(s) 112 can update the open ticket to indicate that the customer has paid for the open ticket. Additionally or alternatively, in some examples, the computing device(s) 112 can close the open ticket.

It should be noted that, in some examples, the merchant may use the second merchant device 108 to only charge the user 102 for a portion of the cost of the open ticket. In such examples, the second merchant device 108 and/or the computing device(s) 112 can attempt to authorize the payment instrument (using the methods above) for only the portion of the cost of the open ticket. The computing device(s) 112 can then send the first merchant device 108 a confirmation that indicates that only the portion of the cost of the transaction has been processed.

It should further be noted that, in some examples, before sending the data associated with the open ticket to the second merchant device 108, the computing device(s) 112 can send the second merchant device 108 a message (e.g., push notification) that indicates that the open ticket is generated and in a charge state (e.g., ready to be charged). Additionally, in some examples, the notification can further indicate a priority for the open ticket. The priority can specify that the open ticket is to be charged before and/or after one or more additional open tickets 160 in the database 154. The second merchant device 108 can then send a request to the computing device(s) 112 for the data associated with the open ticket and receive the data from the computing device(s) 112 in response.

It should further be noted that, in some examples, additionally to or alternatively from causing the second merchant device 108 to charge for the transaction, the computing device(s) 112 can utilize the open ticket for other services. For instance, in some examples, the computing device(s) 112 can send the open ticket to other merchant devices 108 and/or electronic devices that are not associated with the merchant 108 (e.g., a user device 104). In some examples, the merchant can use the open ticket for analytics. For instance, the merchant 108 can use the open ticket to determine when to prepare one or more items that are ordered by the user 102.

Figure 2:
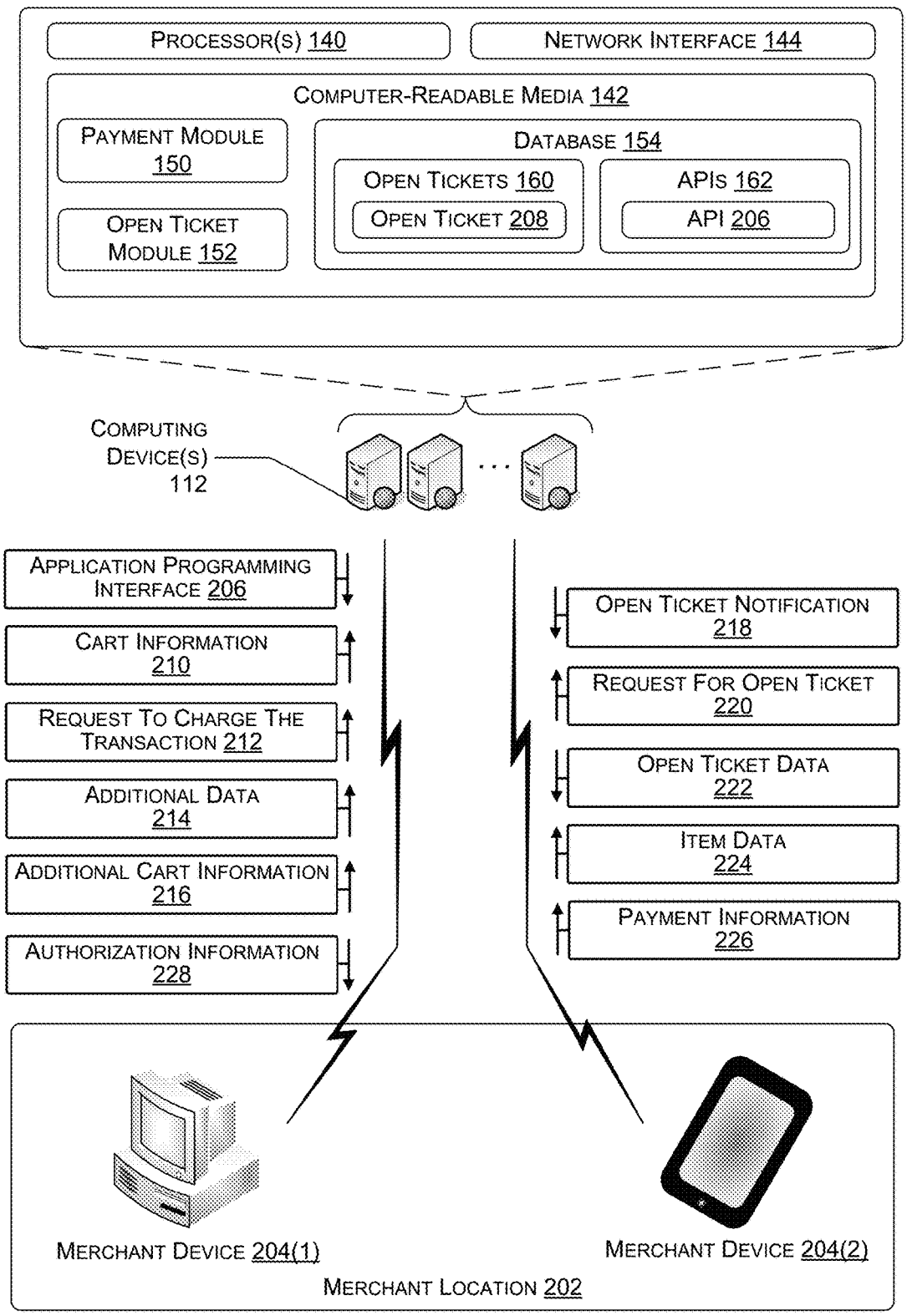
FIG. 2 is an example illustration of a payment service synchronizing an open ticket between electronic devices.

FIG. 2 is an example illustration of a payment service synchronizing an open ticket between electronic devices. In the example of FIG. 2, a merchant location 202 includes a first merchant device 204(1) and a second merchant device 204(2), which can each represent one of the merchant device(s) 108. In some examples, the first merchant device 204(1) can include first hardware and first software (e.g., a first operating platform running a first POS software application) for conducting transactions with customers (e.g., the users 102). Additionally, the second merchant device 204(2) can include second hardware and second software (e.g., a second operating platform running a second POS software application) for conducting transactions with the customers. In some examples, the first hardware and/or the first software of the first merchant device 204(1) may be different than, and not compatible with, the second hardware and/or the second software of the second merchant device 204(2). For instance, the first merchant device 204(11) may be unable to synchronize (e.g., send and receive data) with the second merchant device 204(2).

In the example of FIG. 2, the second POS software application can synchronize the second merchant device 204(2) with the computing device(s) 112 in order to perform operations associated with processing transactions. For instance, in some examples, the computing device(s) 112 may provide the second merchant device 204(2) with the second POS software application so that the second merchant device 204(2) can utilize the second POS software application to synchronize with the computing device(s) 112 to process transaction. For example, the second POS software application executing on the second merchant device 204(2) can synchronize with the payment module 150 of the computing device(s) 112 to process payments for customer. The second POS software application executing on the second merchant device 204(2) can further synchronize with the open ticket module 152 to generate open tickets for customers. Additionally, in some examples, the second merchant device 204(2) can execute the second POS software application to generate open tickets for customers, and then synchronize the open tickets to the computing device(s) 112.

Additionally, in the example of FIG. 2, the first POS software application on the first merchant device 204(1) may not be capable of synchronizing with the computing device(s) 112 to process transactions for customers. For instance, in some examples, the first merchant device 204(1) may include a legacy system that includes POS software that is not compatible with the computing device(s) 112 for creating open tickets and/or processing transactions for customers. Rather, the first POS software application on the first merchant device 204(1) may only provide the first merchant device 204(1) with the capability to locally process transactions on the first merchant device 204(1).

To synchronize open tickets 160 between the merchant devices 204(1)-(2), the computing device(s) 112 can provide the first merchant device 204(1) with an application programming interface (API) 206 of the APIs 162. For instance, in some examples, each of the APIs can include code that provides merchant devices with the functionality to send data for creating open tickets 160 to the computing device(s) 112. The code can further provide the merchant devices with the functionality to send additional data to the computing device(s) 112, such as requests to charge transactions and/or data associated with the merchant devices. In some examples, different APIs are created for different types of merchant devices. As such, merchant devices that include various types of hardware and/or various types of software can utilize the APIs 162 in order to generate open tickets 160 using the computing device(s) 112.

To create an open ticket 208 using the computing device(s) 112, the first merchant device 204(1) receives input corresponding to one or more items acquired by a customer during a transaction. In some examples, the first merchant device 204(1) uses the input to generate a local ticket for the transaction. As discussed above, a local ticket is a data structure that the first merchant device 204(1) uses to store local information (e.g., information from the first merchant device 204(1) associated with interactions with the merchant and the customer. For instance, the local ticket data structure can include data indicating an identity of the merchant, an identity of the customer, a list of the one or more items, a cost associated with each of the one or more items, a total cost for the one or more items, or the like. After generating the local ticket, the first merchant device 204(1) translate the local ticket data structure into cart information 210. The cart information 210 can include data that indicates one or more of the identity of the merchant, the identity of the user, the one or more items, the cost associated with each of the one or more items, the total cost for the one or more items, or the like.

For instance, in some examples, the first hardware and/or first software on the first merchant device 204(1) may configure the first merchant device 204(1) to both generate local tickets for customers, and translate local tickets into the cart information 210 that is compatible with the APIs from the computing device(s) 112 (e.g., the operations are native to the first merchant device 204(1)). In some examples, the first hardware and/or first software on the first merchant device 204(1) may configure the first merchant device 204(1) to generate local tickets for customers, however, the first merchant device 204(1) may be modified to translate the local tickets into the cart information 210. For instance, the merchant may modify the first merchant device 204(1) with additional hardware and/or software that configures the first merchant device 204(1) to switch from a native operational mode into an API-compatible operational mode. While in the API-compatible operational mode, the first merchant device 204(1) is configured to translate local tickets into cart information 210.

For instance, the first merchant device 204(1) can generate the local ticket for the customer. The first merchant device 204(1) can then receive input associated with translating the local ticket into the cart information 210. For instance, the merchant may select a button on the first merchant device 204(1) (physical button, digital representation of a button a touch-sensitive display, etc.) that causes the first merchant device 204(1) to translate the local ticket into the cart information 210. In some examples, based on the input, the first merchant device 204(1) translates the local ticket into the cart information 210 using native operations of the first merchant device 204(1). In some examples, based on the input, the first merchant device 204(1) switches from a native operational mode into an API-compatible mode. The first merchant device 204(1) then translates the local ticket into the cart information 210 while in the API-compatible mode. In either of the examples, translating the local ticket can include utilizing data from the local ticket data structure to generate the cart information 210.

After generating the cart information 210, the first merchant device 204(1) can synchronize with the computing device(s) 112. For instance, in some examples, the first merchant device 204(1) can send the cart information 210 to the computing device(s) 112 via the API 206. Additionally, in some examples, the first merchant device 204(1) can send a request to charge the transaction 212 and/or additional data 214 to the computing device(s) 112 via the API 206. The request to charge the transaction 212 can include data that indicates that the transaction is ready to be charged (e.g., in a charge state). In some examples, the request to charge the transaction 212 can further include data that indicates which merchant device is to charge the transaction. For instance, in the example of FIG. 2, the request to charge the transaction 212 can include data that indicates that the second merchant device 204(2) is to charge the transaction. As will be discussed below, the computing device(s) 112 can use the request to charge the transaction 212 when sending push notifications to other merchant devices.

The additional data 214 can include data that indicates an address associated with the first merchant device 204(1). For instance, the address can include a universal resource locator (URL) associated with the first merchant device 204(1), an internet protocol (IP) address of the first merchant device 204(1), an email address, or any other type of address that the computing device(s) 112 can use to send data back to the first merchant device 204(1). In some examples, the computing device(s) 112 use the additional data 214 to send indications associated with processing the transaction back to the first computing device 112.

The computing device(s) 112 can utilize the open ticket module 152 to generate an open ticket 208 using the cart information 210. As discussed above, the open ticket 208 is a data structure that stores information associated with interactions between the merchant and the customer during a course of the transaction. The interactions can include a name of the merchant, a location of the merchant, a name of the customer, items order by the customer during the transaction, timestamps for each of the items ordered by the customer during the transaction, a cost associated with each of the items, a total cost the items, preferences of the customer, or the like.

In some examples, to generate the open ticket 208, the computing device(s) 112 can utilize the open ticket module 152 to wrap the cart information 210 in an open ticket data structure. Wrapping the cart information 210 in the open ticket data structure can include generating the open ticket data structure for the open ticket 208, and then adding information associated with the one or more items from the cart information 210 to the generated open ticket data structure. The computing device(s) 112 can then determine a cost for each of the items included in the open ticket 208, and use the costs of the items to determine a total cost for the open ticket 208. In some examples, the computing device(s) 112 can further use the cart information 210 to add an identifier of the merchant (e.g., merchant name) to the open ticket 208, an identifier of the customer (e.g., name of the customer) to the open ticket 208, and/or a date/time for the transaction to the open ticket 208.

In some examples, the computing device(s) 112 can further generate the open ticket 208 to include a versioning data structure. In such examples, the computing device(s) 112 use the versioning data structure when synchronizing the open ticket 208 with other merchant devices (e.g., the second merchant device 204(2). For instance, the versioning data structure of the open ticket data structure can include a vector that indicates each time the open ticket data structure is updated (e.g., indicates a version of the open ticket data structure, which is updated each time data is added to the open ticket data structure). For instance, in some examples, each time the open ticket data structure is updated by the computing device(s) and/or another merchant device, a count of the vector can be updated (e.g., increased, such as from one to two).

Also illustrated in the example of FIG. 2, the first merchant device 204(1) can send additional cart information 216 to the computing device(s) 112. For instance, in some examples, after the computing device(s) 112 generate the open ticket 208 based on the cart information 210, the first merchant device 204(1) may receive input corresponding to one or more additional items acquired by the customer during the transaction. In such examples, the first merchant device 204(1) can add the one or more additional items to the local ticket, and generate additional cart information 216 for the one or more additional items using the processes above for the cart information 210. The first merchant device 204(1) can then send the additional cart information 216 to the computing device(s) 112 via the API 206.

In some examples, the computing device(s) 112 can receive the additional cart information 216, and add one or more items from the additional cart information 216 to the generated open ticket 208. For instance, the computing device(s) 112 can utilize the open ticket module 152 to add the one or more additional items acquired by the customer to the open ticket 208 each time the computing device(s) 112 receives additional cart information 216 from the first merchant device 204(1). Additionally, the computing device(s) 112 can add a cost associated with each of the one or more additional items, and update the total cost of the open ticket 208 based on the one or more additional costs. In some examples, the computing device(s) 112 further update the versioning data structure of the open ticket 208 to order to indicate that the open ticket 208 was updated. In some examples, if the computing device(S) 112 already sent data associated with the open ticket 208 to the second merchant device 204(2), then the computing device(s) 112 can send data indicating the one or more additional items and the updated cost of the open ticket 208 to the second merchant device 204(2).

Also illustrated in the example of FIG. 2, the computing device(s) 112 can synchronize with the second merchant device 204(2). For instance, the computing device(s) 112 can send an open ticket notification 218 (e.g., push notification) to the second merchant device 204(2). The open ticket notification 218 can include data indicating one or more of an identity of the open ticket 208, an identity of the first merchant device 204(1), that the open ticket 208 is in a charge state (e.g., ready to be charged), a priority for the open ticket 208 relative to other open tickets 160 in the database 154, or the like.

Based on receiving the open ticket notification 218, the second merchant device 204(2) can send the computing device(s) 112 a request for the open ticket 220. In some examples, when the open ticket notification 240 includes a priority associated with the open ticket 208, the second merchant device 204(2) sends the request for the open ticket 220 based on the priority. For instance, if the priority indicates that the second merchant device 204(2) should charge the open ticket 208 before other open tickets 160 that are pending to be charged, the second merchant device 204(2) can send the request for the open ticket 208 soon after receiving the open ticket notification 218.

Also illustrated in the example of FIG. 2, the computing device(s) 112 send open ticket data 222 to the second merchant device 204(2). In some examples, the open ticket data 222 can include data associated with the open ticket 208. For instance, the open ticket data 222 can include data indicating one or more of an identifier for the open ticket 208, an identifier of the merchant, an identifier of the first merchant device 204(1), items acquired by the customer during the transaction, a cost associated with each of the items, a total cost of the open ticket 208, a data/time that the open ticket was created, or the like.

In some examples, based on receiving the open ticket data 222, the second merchant device 204(2) can provide the data to the merchant. For instance, the second merchant device 204(2) can display one or more of the identifier for the open ticket 208, the identifier of the merchant, the identifier of the first merchant device 204(1), the items acquired by the customer during the transaction, the cost associated with each of the items, or the total cost of the open ticket 208. The merchant can then use the second merchant device 204(2) to process the transaction with the customer based on the items acquired by the customer, or the merchant can use the second merchant device 204(2) to add additional items to the open ticket 208 for the customer.

For instance, in some examples, the second merchant device 204(2) can send item data 224 to the computing device(s) 112. The additional item data 224 can indicate one or more additional items acquired by the customer from the merchant. For instance, the merchant may input one or more additional items associated with the transaction into the second merchant device 204(2). The second merchant device 204(2) can then generate item data 224 corresponding to the one or more additional items, and send the item data 224 to the computing device(s) 112. The computing device(s) 112 can receive the item data 224 from the second merchant device 204(2), add the one or more items indicated in the item data 224 to the generated open ticket 208, add a cost for each of the one or more items, and update the total cost of the generated open ticket 208. In some examples, the computing device(s) 112 further update the vector clock of the open ticket 208 to order to indicate that the open ticket 208 was updated.

Also illustrated in FIG. 2, the merchant can use the second merchant device 204(2) to charge the customer for the transaction. For instance, in some examples, the merchant can input payment information (e.g., information associated with a payment instrument) into the second merchant device 204(2). The second merchant device 204(2) can then charge the customer for at least a portion of the open ticket 208 using the payment information. For instance, in some examples, the second merchant device 204(2) can send the payment information 226 to the computing device(s) 112 for processing. In some examples, the second merchant device 204(2) can send the payment information to a card payment network (e.g., card payment network computing device(s) 164) for processing.

Also illustrated in FIG. 2, the computing device(s) 112 send authorization information 228 to the first merchant device 204(1). For instance, in some examples, after processing at least a portion of the cost of the open ticket 208 for the second merchant device 204(2), and/or after receiving an indication of an amount that the second merchant device 204(2) charged the customer, the computing device(s) 112 can send authorization information 228 to the first merchant device 204(1). In some examples, the authorization information 228 can indicate that the total cost of the open ticket 208 has been charged. In some examples, the authorization information 228 can indicate that only a portion of the total cost of the open ticket 208 has been charged.

In some examples, the computing device(s) 112 send the authorization information 228 to the first merchant device 204(1) using the address of the first merchant device 204(1) from the additional data 214. For instance, in some examples, the address can include a URL associated with the first merchant device 204(1). In such examples, computing device(s) 112 can send the authorization information 228 to the first merchant device 204(1) using the URL.

It should be noted that, in some examples, synchronizing the computing device(s) 112 with the second merchant device 204(2) may not include the computing device(s) 112 sending the open ticket notification 218 to the second merchant device 204(2) and/or the second merchant device 204(2) sending the request for the open ticket 220 to the computing device(s) 112. In such examples, the computing device(s) 112 can generate the open ticket 208 and based on generating the open ticket 208, synchronize with the second merchant device 204(2) by sending the open ticket data 222 to the second merchant device 204(2). Additionally, in such examples, the open ticket data 222 can indicate that the open ticket 208 is in a charge state. In some examples, the open ticket data 222 may further indicate that first merchant device 204(1) requests that the second merchant device 204(2) charge the customer for the cost of the open ticket 208.

It should further be noted that, in some examples, the open ticket data 222 can include data from open tickets 160 other than then generated open ticket 208. For instance, in some examples, open ticket data 222 can include data associated with each of the open tickets 160 that the computing device(s) 112 have stored in the database 154. In some examples, where the computing device(s) 112 have already sent the second merchant device 204(2) data associated with open tickets 160, the open ticket data 222 can include data associated with each of the open tickets 160 that were not previously sent to the second merchant device 204(2) (e.g., any new open tickets 160 created by the computing device(s) 112). Additionally or alternatively, in some examples, open ticket data 222 can include updates to the open ticket 208 and/or updates to one or more additional open tickets 160 that computing device(s) 112 stores in the database 154. When sending updates to open tickets 160, the computing device(s) 112 can send the open ticket data 222 associated with the updates each time one of the open tickets 160 is updated by the computing device(s) 112.

It should further be noted that, in some examples, the first merchant device 204(1) can send the cart information 210 to the second merchant device 204(2). In such examples, the second merchant device 204(2) can generate the open ticket 208 using the cart information 210 and/or the second merchant device 204(2) can send the cart information 210 to the computing device(s) 112. Additionally, the second merchant device 204(2) can charge the customer for the cost of the open ticket 208, and send an indication of an amount that the customer was charged to the first merchant device 204(1).

Figure 3:
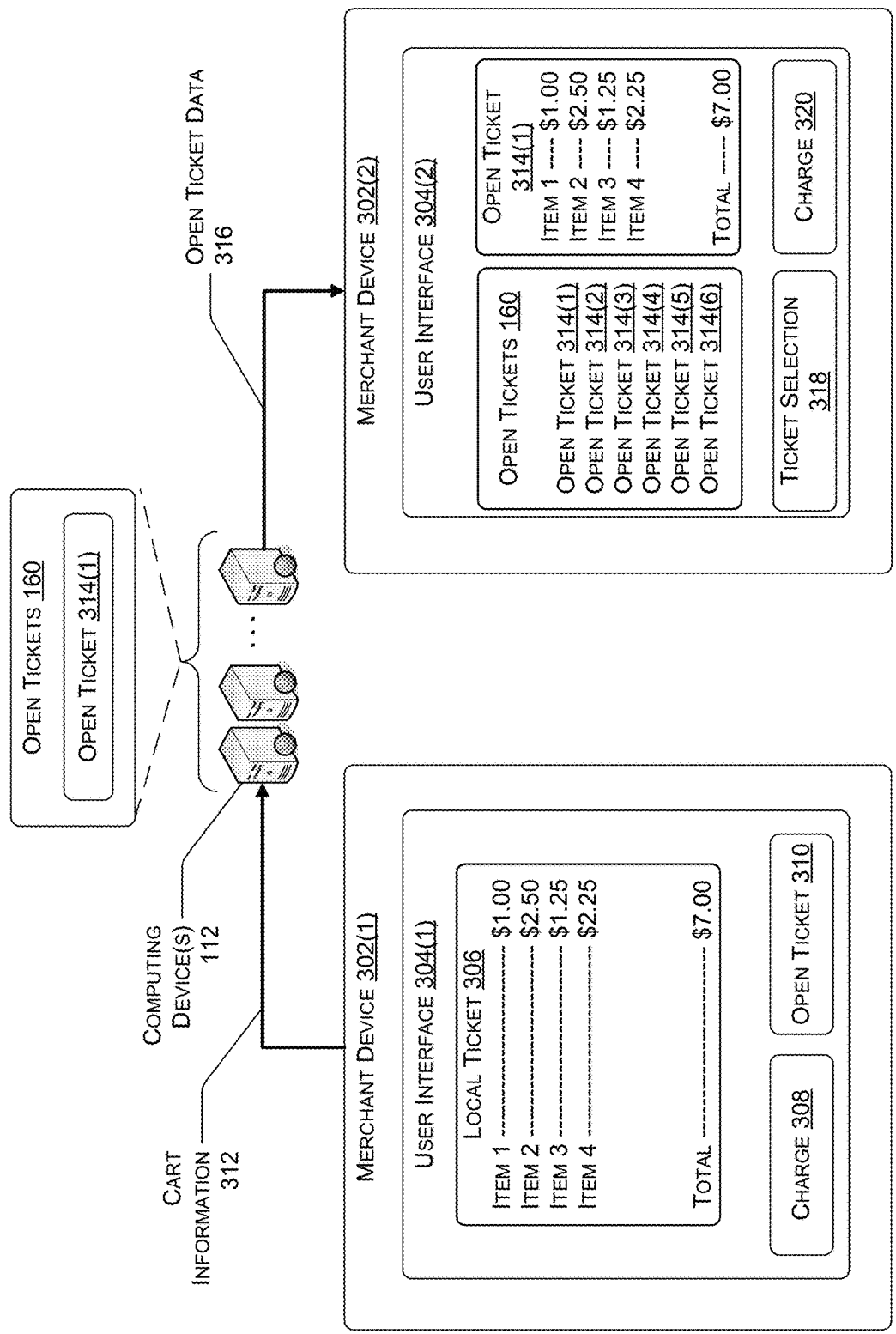
FIG. 3 is an example illustration of electronic devices providing user interfaces during synchronization of an open ticket.

FIG. 3 is an example illustration of electronic devices providing user interfaces during synchronization of an open ticket. As illustrated in FIG. 3, a first merchant device 302(1) and a second merchant device 302(2), which can respectively represent the first merchant device 204(1) and the second merchant device 204(2), provide a first user interface 304(1) and a second user interface 304(2), respectively. For instance, a merchant may use the first merchant device 302(1) to input items 1-4 for a customer. The first merchant device 302(1) may generate a local ticket 306 based on the input, where the local ticket 306 includes the items 1-4, a cost for each of the items 1-4, and a total cost of the local ticket 306. The merchant can then use the charge 308 button on the first user interface 304(1) to charge the customer for the items, or the merchant can use the open ticket 310 button on the first user interface 304(1) to send cart information 312 (which can represent cart information 210) to the computing device(S) 112.

As discussed above, the open ticket 310 button on the first user interface 304(1) can include a third-party tender button that causes the first merchant device 302(1) to translate the local ticket 306 into cart information 312. The cart information 312 can include data that indicates one or more of an identity of the merchant, an identity of the customer, items 1-4, the cost associated with each of the items 1-4, the total cost for the items 1-4, or the like. The first merchant device 302(1) can then send the cart information 312 to the computing device(s) 112 via an API.

The computing device(s) 112 can receive the cart information 312 from the first merchant device 302(1) and generate an open ticket 314(1) (which can represent the open ticket 208) based on the cart information 312. In some examples, the open ticket 314(1) can include one or more of an identifier for the open ticket 314(1), an identifier of the merchant, an identifier of the first merchant device 302(1), the items 1-4, a cost associated with each of the items 1-4, a total cost of the open ticket 314(1), a data/time that the open ticket 314(1) was created, a versioning data structure, or the like. The computing device(s) 112 can store the open ticket 314(1) with other open tickets 160 in a database (e.g., database 154). Additionally or alternatively, the computing device(s) 112 can synchronize with the second merchant device 302(2) by sending open ticket data 316, which can represent the open ticket data 222, to the second merchant device 302(2).

Also illustrated in the example of FIG. 3, the second merchant device 302(2) provides the second user interface 304(2). The second user interface 304(2) includes a list of the open tickets 160 that are stored on the computing device(s) 112. In some examples, the merchant can use the second user interface 304(2) to select one or the open tickets 314(1)-(6) from the list of open tickets 160. The merchant can then select the ticket selection 318 button on the second user interface 304(2). In some examples, selecting the ticket selection 318 button causes the second merchant device 302(2) to synchronize with the computing device(s) 112 by sending a request to the computing device(s) 112 for the open ticket data 316. In such examples, the computing device(s) may not send the open ticket data 316 to the second merchant device 302(2) until the computing device(s) 112 receive the request from the second merchant device 302(2).

Additionally or alternatively, in some examples, selection of the open ticket 314(1) causes the second user interface 304(2) to provide the open ticket data 316. For instance, in the example of FIG. 3, the second user interface 304(2) displays the identity of the open ticket 314(1), the items 1-4 acquired by the customer, the cost for each of the items 1-4, and a total cost of the open ticket 314(1). The merchant can then use the charge 320 button on the second user interface 304(2) to charge the customer for the open ticket 314(1).

Figure 4A:
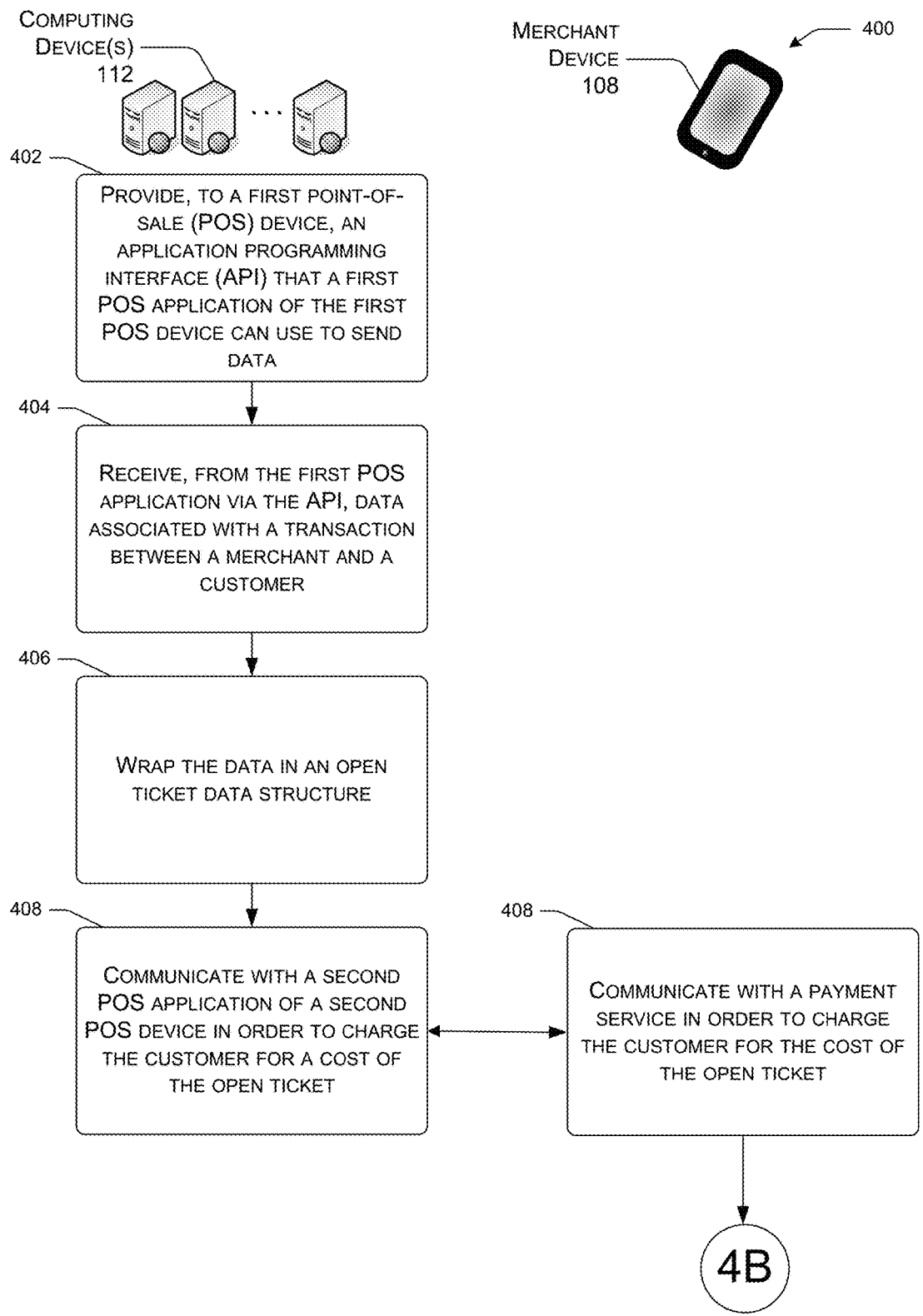
FIGS. 4A-4B is a flow diagram illustrating an example process for facilitating open ticket synchronization between electronic devices using application programming interfaces.
Figure 4B:
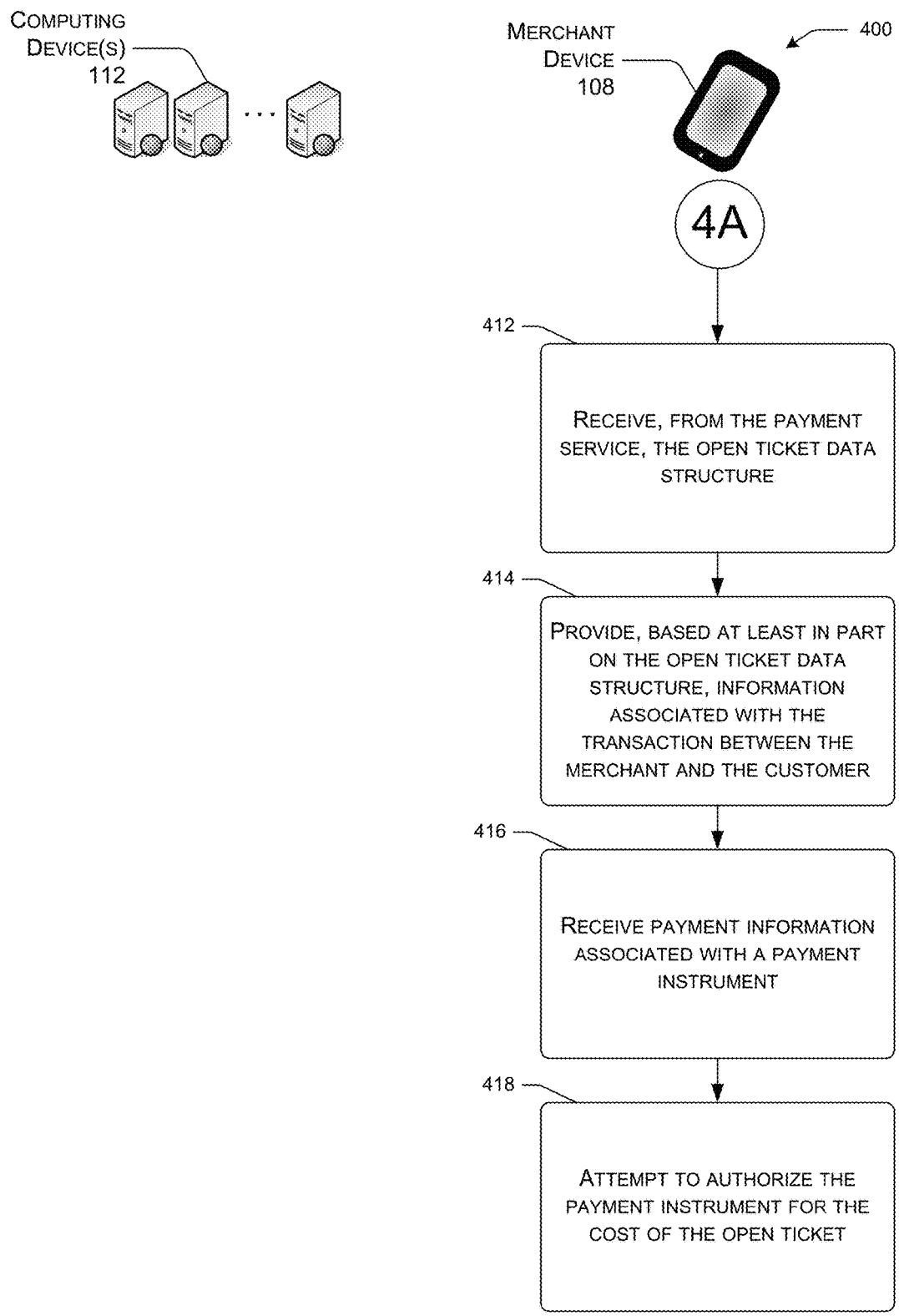

FIGS. 4A-4B is a flow diagram illustrating an example process for facilitating open ticket synchronization between electronic devices using application programming interfaces. The process 400 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 500, and other processes described herein, may be performed by a remote payment service (e.g., computing device(s) 112), a POS device (e.g., merchant device(s) 108), by another entity, or by a combination thereof.

At 402, the computing device(s) 112 provide, to a first merchant device of a merchant, an application programming interface (API) that a first POS application of the first merchant device can use to send data to the computing device(s) 112. For instance, the first POS application of the first merchant device may not configure the first merchant device to process transactions using the computing device(s) 112. As such, the computing device(s) 112 can provide the first merchant device with an API that the first POS application can use to send data to the computing device(s) 112.

At 404, the computing device(s) 112 receive, from the first POS application via the API, data associated with a transaction between a merchant and a customer and at 406, the computing device(s) 112 wrap the data in an open ticket data structure. For instance, the open ticket data structure can correspond to an open ticket that is generated for the transaction between the merchant and the customer. In some examples, the open ticket data structure can include data indicating one or more items that are indicated in the data. In some examples, the open ticket data structure can further include a versioning data structure that the computing device(s) 112 use to synchronize the open ticket with other merchant devices. For instance, since the open ticket data structure was just generated by the computing device(s) 112, the versioning data structure may indicate that this is the first version of the open ticket data structure.

At 408, the computing device(s) 112 communicate with a second POS application of a second merchant device 108 of the merchant in order to charge the customer for a cost of the open ticket and at 410, the second merchant device 108 communicates with the computing device(s) 112 in order to charge the customer for the cost of the open ticket. For instance, the second POS application may configure the second merchant device 108 to process transactions for customers using the computing device(s) 112.

At 412, the second merchant device 108 (and/or second POS application) receives, from the computing device(s) 112, the open ticket data structure and at 414, the second merchant device 108 (and/or the second POS application) provides, based at least in part on the open ticket data structure, information associated with the transaction between the merchant and the customer. For instance, the second merchant device 108 can determine that this is the first version of the open ticket data structure based on the versioning data structure. The second merchant device 108 can further display a user interface that includes at least the one or more items acquired by the customer, a cost for each of the one or more items, and a total cost for the open ticket.

At 416, the second merchant device 108 (and/or the second POS application) receives payment information associated with a payment instrument and at 418, the second merchant device 108 (and/or the second POS application) attempts to authorize the payment instrument for the cost of the open ticket. For instance, in some examples, the second merchant device 108 can send the payment information to the computing device(s) 112 in order to cause the computing device(s) 112 to process the payment instrument. In some examples, the second merchant device 108 can send the payment information to a card payment network computing device (e.g., card payment network computing device(s) 164) in order to process the payment instrument.

In some examples, the computing device(s) 112 can further send, to the first merchant device, an indication associated with the charge of the open ticket. For instance, the computing device(s) 112 can send the first merchant device an indication that the payment instrument has been charged for the cost of the open ticket. In some examples, the computing device(s) 112 send the notification using an address (e.g., URL) associated with the first merchant device.

Figure 5:
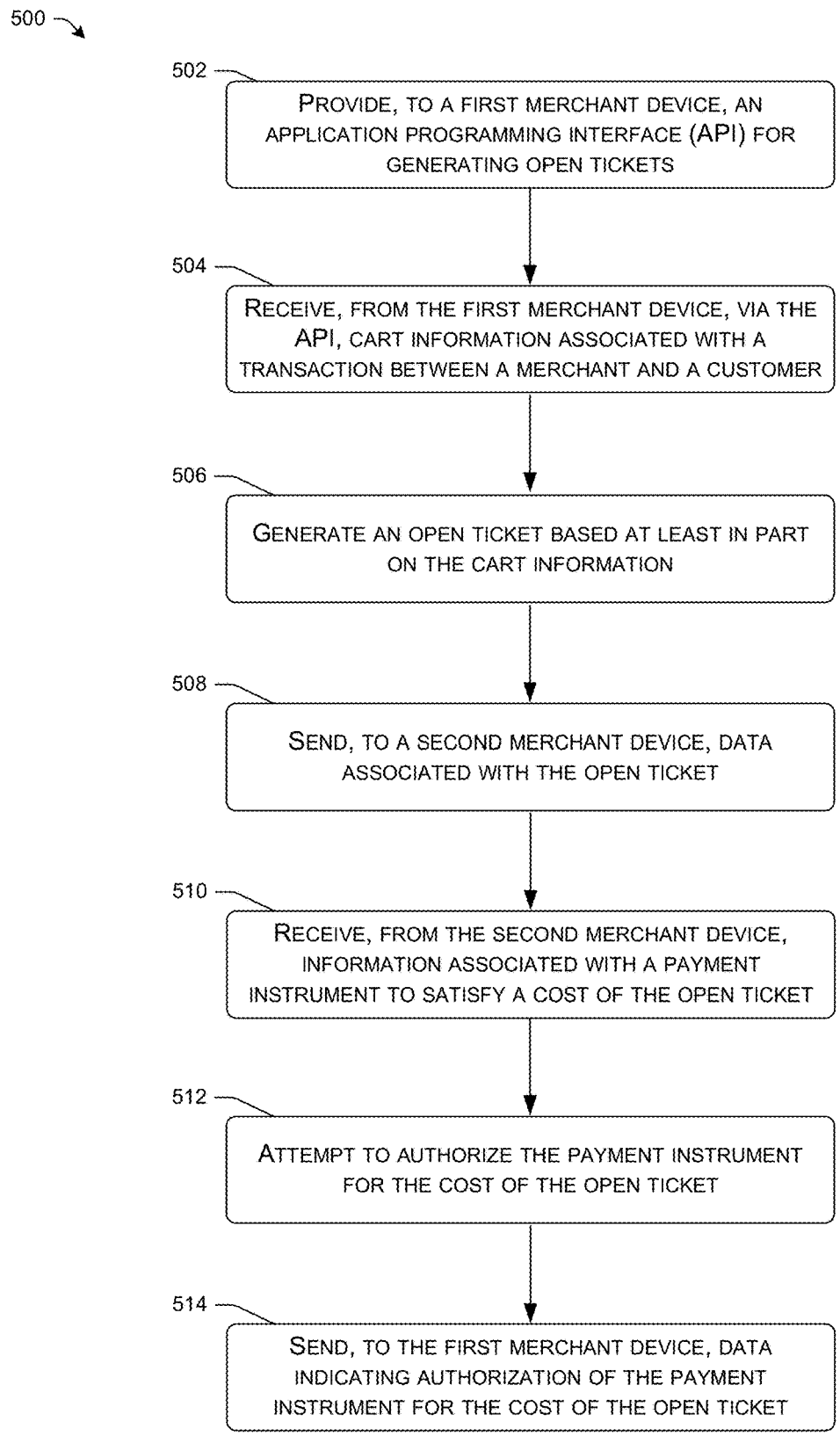
FIG. 5 is a flow diagram illustrating an example process of a payment service facilitating synchronization between electronic devices using application programming interfaces.

FIG. 5 is a flow diagram illustrating an example process of a payment service facilitating synchronization between electronic devices using application programming interfaces. At 502, the process 500 provides, to a first merchant device, an application programming interface (API) for generating open tickets. For instance, based on hardware and/or software (e.g., an operating platform running software) of a first merchant device, the first merchant device may not be configured to synchronize with a payment service to process transactions for customer. As such, the payment service can thus provide the first merchant device with an API that the first merchant device can use to generate open tickets using the payment service.

At 504, the process 500 receives, from the first merchant device, via the API, cart information associated with a transaction between a merchant and a customer. For instance, the first merchant device can receive input from the merchant that indicates one or more items acquired by the customer. The first merchant device can then generate a local ticket based on the one or more items. Additionally, the first merchant device can translate the local ticket into cart information that indicates at least the one or more items. The payment service can receive the cart information from the first merchant device via the API.

At 506, the process 500 generates an open ticket based at least in part on the cart information. For instance, the payment service can generate an open ticket data structure using the cart information that the payment service receives from the first merchant device. The open ticket can include at least an identity of the customer, the items acquired by the customer, a cost of each of the items, and a cost of the open ticket. In some examples, the payment service can store the open ticket in a database of open tickets.

At 508, the process 500 sends, to a second merchant device, data associated with the open ticket. For instance, the payment service can synchronize with the second merchant device by sending data associated with the open ticket to the second merchant device based on the payment service generating the open ticket. In some examples, the payment service sends a push notification to the second merchant device before sending the data. The push notification can indicate that the open ticket is in a charge state. In some examples, the push notification can further indicate a priority associated with the open ticket. The payment service can then receive a request for the open ticket from the second merchant device and, in response, send the data associated with the open ticket to the second merchant device.

At 510, the process 500 receives, from the second merchant device, information associated with a payment instrument to satisfy a cost of the open ticket and at 512, the process 500 can attempt to authorize the payment instrument for the cost of the open ticket. For instance, the payment service can receive the information associated with the payment instrument from the second merchant device. In some examples, the payment service further receives an indication of an amount to charge the customer. The payment service can then communicate with a card payment network computing device to attempt to authorize the payment instrument for the amount.

At 514, the process 500 sends, to the first merchant device, data indicating authorization of the payment instrument for the cost of the open ticket. For instance, the payment service can send a push notification to the first merchant device that indicates an amount that the customer has been charged with regard to the open ticket. In some examples, the payment service can use an address (e.g., URL) associated with the first merchant device to send the push notification.

Figure 6:
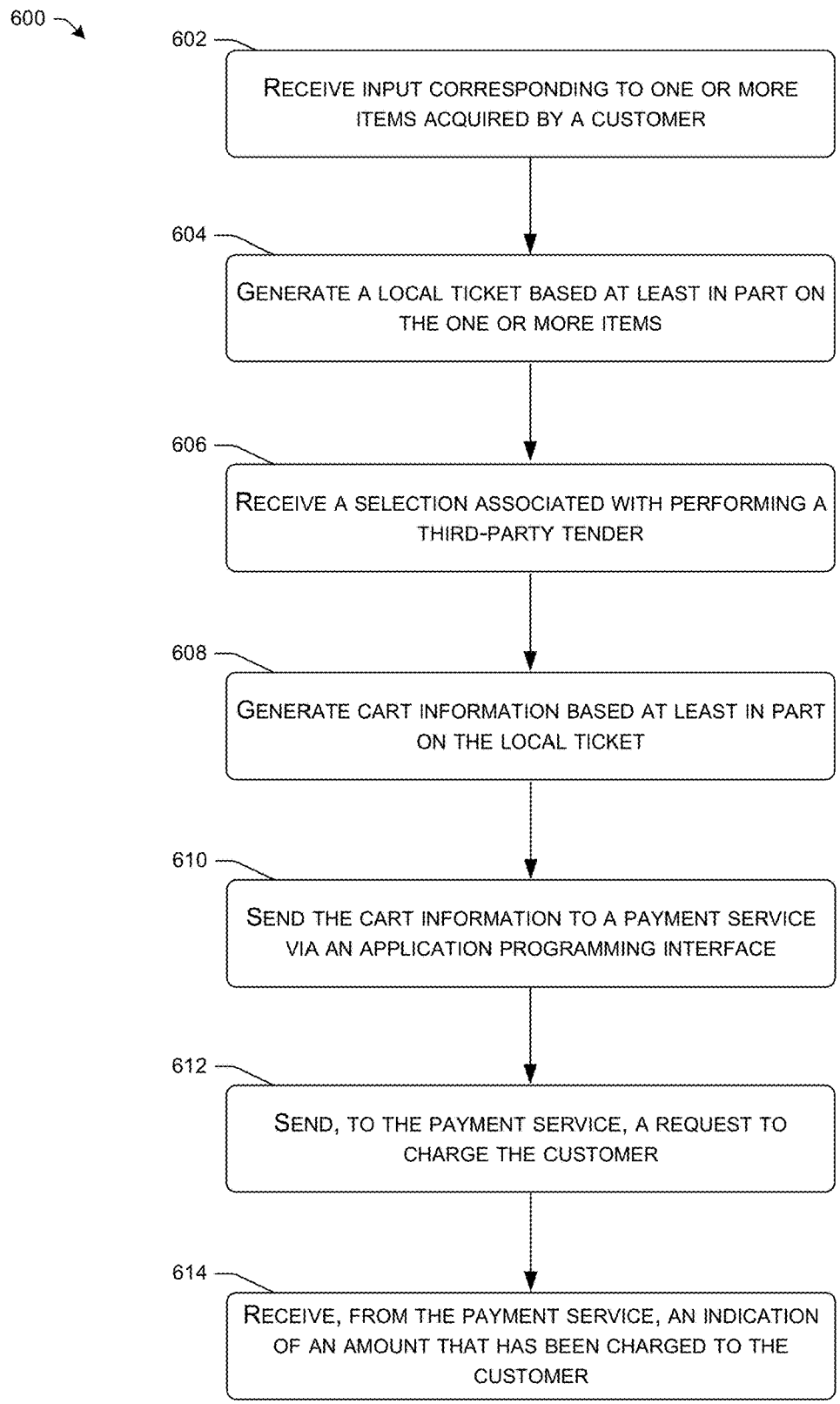
FIG. 6 is a flow diagram illustrating an example process of a merchant device using an application programming interface to create open tickets.

FIG. 6 is a flow diagram illustrating an example process of a merchant device using an application programming interface to create open tickets. At 602, the process 600 receives input corresponding to one or more items acquired by a customer and at block 604, the process 600 generates a local ticket based at least in part on the one or more items. For instance, a POS application executing on a merchant device can receive input from a merchant, the input indicating one or more items acquired by a customer from the merchant. The POS application executing on the merchant device can then generate a local ticket that is based at least in part on the one or more items. For instance, in some examples, the local ticket can include at least a list of the one or more items, a cost for each of the one or more items, and a total cost of the local ticket.

At 606, the process 600 receives a selection associated with performing a third-party tender and at 608, the process 600 generates cart information based at least in part on the local ticket. For instance, the POS application executing on the merchant device may provide a user interface that includes the local ticket, a button to charge the customer for the cost of the local ticket, and a button to perform third-party tender. The POS application executing on the merchant device can then receive input from the merchant that selects the button to perform third-party tender. Based on receiving the input, the POS application executing on the merchant device can generate cart information using the local ticket. In some examples, the cart information can include at least data indicating the one or more items acquired by the customer.

At 610, the process 600 sends the cart information to a payment service via an application programming interface and at 612, the process 600 sends, to the payment service, a request to charge the customer. For instance, the POS application executing on the merchant device can send a call to a payment service for the application programming interface (API). The POS application executing on the merchant device can then use the API to send the cart information to the payment service. Additionally, the POS application executing on the merchant device can further send a request to the payment service to charge the customer. In some examples, the request includes an identity of another merchant device that the payment service can use when processing the transaction. In some examples, the request includes an address (e.g., URL) associated with the merchant device that the payment service can use to send data back to the merchant device.

At 614, the process 600 receives, from the payment service, an indication of an amount that has been charged to the customer. For instance, the POS application executing on the merchant device can receive an indication of an amount that the payment service charged to the customer. In some examples, the amount can include a total cost of the local ticket. In some examples, the amount may only include a portion of the total cost of the local ticket. The merchant device can then provide the amount to the merchant using a user interface.

Figure 7:
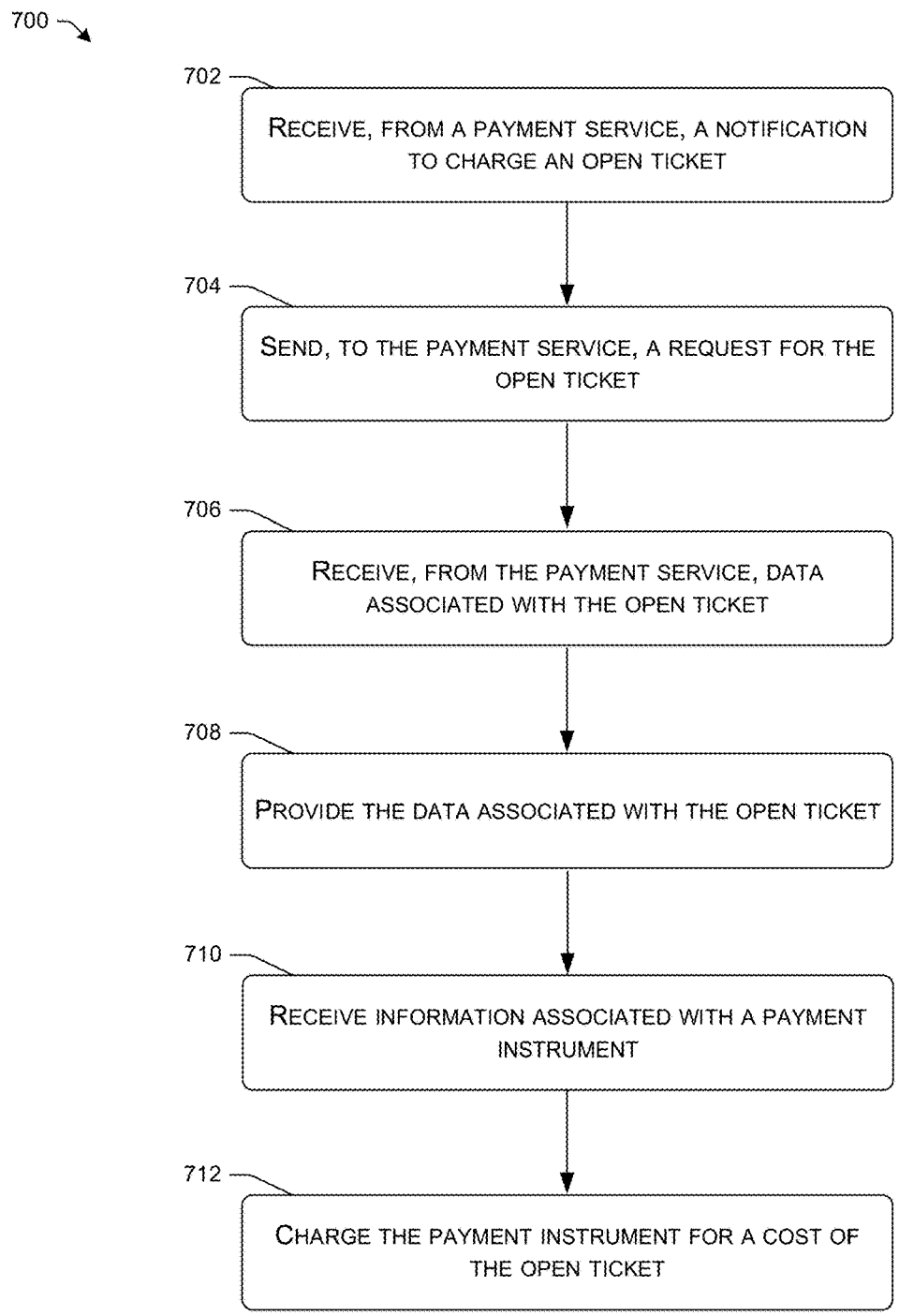
FIG. 7 is a flow diagram illustrating an example process of a merchant device charging an open ticket that is created based on cart information from another merchant device.

FIG. 7 is a flow diagram illustrating an example process of a merchant device charging an open ticket that is created based on cart information from another merchant device. At 702, the process 700 receives, from a payment service, a notification to charge an open ticket. For instance, a merchant device can synchronize with a payment service by receiving a push notification from a payment service, where the push notification indicates that an open ticket is in a charge state. In some examples, the push notification can further indicate a priority associated with the open ticket. For instance, the push notification can indicate that the merchant device is to charge the open ticket before any other open tickets that the merchant device has yet to charge.

At 704, the process 700 sends, to the payment service, a request for the open ticket and at 706, the process 700 receives, from the payment service, data associated with the open ticket. For instance, the merchant device can send a request for the open ticket to the payment service. In some examples, the merchant device sends the request based on a priority included in the push notification. For instance, the merchant device can send the request in response to receiving the push notification when the push notification indicates a high priority for the open ticket. Based on sending the request, the merchant device can then receive data associated with the open ticket from the payment service. In some examples, the data can include at least an indication of one or more items included in the open ticket, a cost of each of the one or more items, and a cost of the open ticket.

At 708, the process 700 provides the data associated with the open ticket and at 710, the process 700 receives information associated with a payment instrument. For instance, the merchant device can display a user interface that includes the data associated with the open ticket to the merchant. The merchant device can then receive input corresponding to information associated with a payment instrument. For instance, the merchant device can receive the input via a card reader.

At 712, the process 700 charges the payment instrument for a cost of the open ticket. For instance, the merchant device can use the information associated with the payment instrument to charge the payment instrument for a cost of the open ticket. In some examples, the merchant device can send the information associated with the payment instrument to the payment service for processing. In some examples, the merchant device can send the information associated with the payment instrument to a card payment computing device for processing. In such examples, the merchant device can then send the payment service a notification indicating that the customer has been charged for the cost of the open ticket.

As previously stated, each of the above discussed scenarios is merely an example and many variations are possible. Moreover, many variations of the techniques discussed above are possible as well without departing from the scope of this disclosure. For example, the techniques and systems disclosed herein may be utilized in contexts other than open ticket transactions. In a particular variation, the techniques and systems disclosed herein may be utilized in the context of inventory synchronization between merchant devices in a manner similar to that discussed above.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more service computing devices associated with a payment service that processes transactions for multiple merchants including a merchant, the one or more service computing devices programmed to perform acts comprising;
   exposing at least one application programming interface (API) configured to (i) receive transaction data from a first point-of-sale (POS) device operable by the merchant and (ii) send the transaction data to a second POS device operable by the merchant via the one or more service computing devices, the second POS device including a card reader;
   receiving, from the first POS device and via the at least one API, the transaction data associated with a transaction between a customer and the merchant, the transaction data indicating an amount to charge using the card reader for at least one item ordered by the customer from the merchant in the transaction; and
   sending, to the second POS device, at least a portion of the transaction data to be used by the second POS device and the card reader for generating payment data associated with a payment card of the customer, the payment data being generated for processing payment for the transaction, at least in part, by the payment service.

2. The system as claim 1 recites, the acts further comprising, prior to receiving the transaction data, receiving, via the at least one API, information describing the merchant, wherein the information describing the merchant includes at least one of a name of the merchant or contact information associated with the merchant, and the information describing the merchant is stored in a database associated with the one or more service computing devices.

3. The system as claim 1 recites, the acts further comprising storing, in a database associated with the one or more service computing devices, at least one record representative of at least one transaction conducted by the merchant.

4. The system as claim 1 recites, the acts further comprising receiving, via the at least one API, information describing the customer, wherein the information describing the customer includes at least one of an identifier of the customer or financial account information of the customer, and the information describing the customer is stored in a database associated with the one or more service computing devices.

5. The system as claim 1 recites, the acts further comprising:
   receiving additional transaction data associated with at least one additional transaction between the merchant and at least one additional customer; and
   storing the transaction data and the additional transaction data in a queue until at least the portion of the transaction data or the additional transaction data is sent to the second POS device.

6. The system as claim 1 recites, the acts further comprising:
   prior to sending at least the portion of the transaction data to the second POS device, receiving, from the second POS device, a request for queued transaction data; and
   sending at least the portion of the transaction data responsive to receiving the request.

7. The system as claim 1 recites, the acts further comprising:
   receiving, from the second POS device, the payment data generated by the second POS device using the card reader to read the payment data from the payment card; and
   sending the payment data to a payment gateway.

8. The system as claim 1 recites, the acts further comprising causing a response indicating whether the payment card is authorized for a cost of the transaction to be sent to the second POS device.

9. The system as claim 1 recites, the acts further comprising sending, to the first POS device and via the at least one API, information associated with the processing of the payment for the transaction by the payment service, the first POS device presenting at least a portion of the information via a display associated with the first POS device.

10. The system as claim 9 recites, the acts further comprising:
    receiving, from the first POS device and via the at least one API, a universal resource locator (URL) associated with the transaction data, the URL being associated with the first POS device; and
    sending the information to the first POS device based at least in part on the URL.

11. The system as claim 9 recites, wherein presenting at least the portion of the information comprises presenting at least the portion of the information via an electronic receipt.

12. The system as claim 9 recites, the acts further comprising:
receiving, from the second POS device, an indication that payment for the transaction has been processed; and
sending the information to the first POS device responsive to receiving the indication.

13. A method comprising:
exposing, by one or more service computing devices associated with a payment service, at least one interface configured to (i) receive transaction data from a first point-of-sale (POS) device operable by a merchant and (ii) send at least a portion of the transaction data to a second POS device operable by the merchant via the one or more service computing devices, the second POS device being associated with a card reader;
receiving, from the first POS device and via the at least one interface, the transaction data associated with a transaction between a customer and the merchant, the transaction data indicating an amount to charge using the card reader for at least one item ordered by the customer from the merchant in the transaction; and
sending, to the second POS device, at least the portion of the transaction data to be used by the second POS device and the card reader for generating payment data associated with a payment card of the customer, the payment data being generated for processing payment for the transaction, at least in part, by the payment service.

14. The method as claim 13 recites, further comprising receiving, via the at least one interface, information describing at least one of the merchant or the customer, wherein:
the information describing the merchant includes at least one of a name of the merchant or contact information associated with the merchant, and the information describing the merchant is stored in one or more databases associated with the one or more service computing devices; and
the information describing the customer includes at least one of an identifier of the customer or financial account information of the customer, and the information describing the customer is stored in the one or more databases.

15. The method as claim 13 recites, further comprising:
receiving additional transaction data associated with at least one additional transaction between the merchant and at least one additional customer; and
storing the transaction data and the additional transaction data in a queue until at least the portion of the transaction data or the additional transaction data is sent to the second POS device.

16. The method as claim 13 recites, further comprising:
prior to sending at least the portion of the transaction data to the second POS device, receiving, from the second POS device, a request for queued transaction data; and
sending at least the portion of the transaction data responsive to receiving the request.

17. The method as claim 13 recites, further comprising:
receiving, from the second POS device, the payment data generated by the second POS device using the card reader to read the payment data from the payment card; and
sending the payment data to a payment gateway.

18. The method as claim 13 recites, further comprising causing a response indicating whether the payment card is authorized for a cost of the transaction to be sent to the second POS device.

19. The method as claim 13 recites, further comprising sending, to the first POS device and via the at least one interface, information associated with the processing of the payment for the transaction by the payment service, the first POS device presenting at least a portion of the information via a display associated with the first POS device.

20. The method as claim 19 recites, further comprising:
receiving, from the first POS device and via the at least one interface, a universal resource locator (URL) associated with the transaction data, the URL being associated with the first POS device; and
sending the information to the first POS device based at least in part on the URL.

21. The method as claim 19 recites, wherein presenting at least the portion of the information comprises presenting at least the portion of the information via an electronic receipt.

22. The method as claim 19 recites, further comprising:
receiving, from the second POS device, an indication that payment for the transaction has been processed; and
sending the information to the first POS device responsive to receiving the indication.

23. One or more non-transitory computer-readable media storing instructions that, when executed by one or more processors, cause the one or more processors to perform operations comprising:
exposing, by one or more service computing devices associated with a payment service, at least one interface configured to (i) receive transaction data from a first point-of-sale (POS) device operable by a merchant and (ii) send at least a portion of the transaction data to a second POS device operable by the merchant via the one or more service computing devices, the second POS device being associated with a card reader;
receiving, from the first POS device and via the at least one interface, the transaction data associated with a transaction between a customer and the merchant, the transaction data indicating an amount to charge using the card reader for at least one item ordered by the customer from the merchant in the transaction; and
sending, to the second POS device, at least the portion of the transaction data to be used by the second POS device and the card reader for generating payment data associated with a payment card of the customer, the payment data being generated for processing payment for the transaction, at least in part, by the payment service.

24. The one or more non-transitory computer-readable media as claim 23 recites, the operations further comprising receiving, via the at least one interface, information describing at least one of the merchant or the customer, wherein:
the information describing the merchant includes at least one of a name of the merchant or contact information associated with the merchant, and the information describing the merchant is stored in one or more databases associated with the one or more service computing devices; and
the information describing the customer includes at least one of an identifier of the customer or financial account information of the customer, and the information describing the customer is stored in the one or more databases, and wherein the one or more databases further store at least one record representative of at least one transaction conducted by the merchant.

25. The one or more non-transitory computer-readable media as claim 23 recites, the operations further comprising:
receiving additional transaction data associated with at least one additional transaction between the merchant and at least one additional customer; and
storing the transaction data and the additional transaction data in a queue until at least the portion of the transaction data or the additional transaction data is sent to the second POS device.

26. The one or more non-transitory computer-readable media as claim 23 recites, the operations further comprising:
prior to sending at least the portion of the transaction data to the second POS device, receiving, from the second POS device, a request for queued transaction data; and
sending at least the portion of the transaction data responsive to receiving the request.

27. The one or more non-transitory computer-readable media as claim 23 recites, the operations further comprising:
receiving, from the second POS device, the payment data generated by the second POS device using the card reader to read the payment data from the payment card; and
sending the payment data to a payment gateway.

28. The one or more non-transitory computer-readable media as claim 23 recites, the operations further comprising:
causing a response indicating whether the payment card is authorized for a cost of the transaction to be sent to the second POS device.

29. The one or more non-transitory computer-readable media as claim 23 recites, the operations further comprising sending, to the first POS device and via the at least one interface, information associated with the processing of the payment for the transaction by the payment service, the first POS device presenting at least a portion of the information via a display associated with the first POS device, wherein presenting at least the portion of the information comprises presenting at least the portion of the information via an electronic receipt.

30. The one or more non-transitory computer-readable media as claim 29 recites, the operations further comprising:
receiving at least one of:
(i) a universal resource locator (URL) associated with the transaction data from the first POS device and via the at least one interface, the URL being associated with the first POS device; or
(ii) an indication from the second POS device that payment for the transaction has been processed; and
sending the information to the first POS device based at least in part on (i) the URL or (ii) the indication.

* * * * *